United States Patent
Lin

(10) Patent No.: US 8,424,831 B2
(45) Date of Patent: Apr. 23, 2013

(54) ONE-PIECE SUPPORT STAND

(76) Inventor: Chin-Sheng Lin, New Taipei (TW)

(*) Notice: Subject to any disclaimer, the term of this patent is extended or adjusted under 35 U.S.C. 154(b) by 98 days.

(21) Appl. No.: 13/105,049

(22) Filed: May 11, 2011

(65) Prior Publication Data

US 2012/0006951 A1    Jan. 12, 2012

(30) Foreign Application Priority Data

Jul. 8, 2010  (TW) ............................... 99213073 U

(51) Int. Cl.
    A47B 97/04    (2006.01)
(52) U.S. Cl.
    USPC ........ 248/460; 248/441.1; 248/446; 248/459; 40/610; 211/72; 211/42; 211/43
(58) Field of Classification Search ............... 248/441.1, 248/446, 459, 176.1, 188.6, 460; 211/72, 211/42, 43, 41.2, 26; 40/610; 220/629
    See application file for complete search history.

(56) References Cited

U.S. PATENT DOCUMENTS

| | | | | |
|---|---|---|---|---|
| 167,031 A * | 8/1875 | Ullrich | | 366/223 |
| 1,399,507 A * | 12/1921 | Mills | | 248/459 |
| 1,682,837 A * | 9/1928 | Engel | | 248/459 |
| 2,550,857 A * | 5/1951 | Overbaugh | | 248/459 |
| 4,607,817 A * | 8/1986 | Aquino | | 248/459 |
| 5,080,316 A * | 1/1992 | MacEwan | | 248/459 |
| 5,183,163 A * | 2/1993 | Slaiken | | 211/43 |
| 5,388,798 A * | 2/1995 | Glick | | 248/459 |
| 5,868,373 A * | 2/1999 | Duff | | 248/459 |
| 5,971,165 A * | 10/1999 | Levins | | 211/43 |
| 6,321,918 B1 * | 11/2001 | Rollins | | 211/40 |
| 7,000,882 B2 * | 2/2006 | Snuffer et al. | | 248/459 |
| 7,798,530 B1 * | 9/2010 | Mercado | | 281/42 |
| 2004/0188588 A1 * | 9/2004 | Smith | | 248/459 |
| 2008/0230672 A1 * | 9/2008 | Pachowski | | 248/453 |
| 2009/0179124 A1 | 7/2009 | Caplan | | |
| 2009/0321605 A1 * | 12/2009 | Petrie | | 248/452 |

* cited by examiner

*Primary Examiner* — Terrell McKinnon
*Assistant Examiner* — Michael McDuffie
(74) *Attorney, Agent, or Firm* — Chun-Ming Shih; HDLS IPR Services

(57) ABSTRACT

A one-piece support stand is provided for slantingly supporting an object on a work surface, and the support stand includes a central folding line for dividing the support stand into a left support panel and a right support panel interconnected with each other, and each of the support panels being substantially in a triangular shape and having a bottom edge and a bevel edge, and an inverted hook portion being formed at an intersection of the bottom edge and the bevel edge and bent towards the bevel edge, wherein the support stand is erected on the work surface by means of setting an included angle between the two bottom edges, and the two bevel edges and the two inverted hook portions being provided for supporting the object. The support stand features of a firm support, a foldable design, a convenient carry, a simple manufacturing procedure and a low manufacturing cost.

3 Claims, 3 Drawing Sheets

ONE-PIECE SUPPORT STAND

FIELD OF THE INVENTION

The present invention relates to a one-piece support stand, in particular to a support stand applicable for putting a thin electronic device or a book thereon.

BACKGROUND OF THE INVENTION

As science and technology advance, various thin electronic devices such as mobile phones, digital cameras, personal digital assistants (PDA), touch phones, or e-Books are developed and introduced to the market continuously and used extensively in our daily life. In the use of these thin electronic devices on a table top, users sometimes may put a thin electronic device on a support stand, such that the electronic device can be tilted and supported on the table top to facilitate the users to view information displayed on a screen of the thin electronic device.

However, most of the conventional support stands have a complicated structure with a plurality of connecting rods and support legs but without any one-piece support stand; some conventional support stands can be placed on tables only, but they cannot be folded or carried easily by users; and some conventional support stands can be folded by using a pivot, but the total volume and the total thickness of these support stands fail to meet the light, thin, short and compact requirements, and users are reluctant to carry the support stands of this sort.

Therefore, finding a way to overcome the aforementioned shortcomings of the prior art is the main objective of the present invention.

SUMMARY OF THE INVENTION

Therefore, it is a primary objective of the present invention to provide a one-piece support stand with the features of supporting an object firmly, and providing a foldable weight, thin, short and compact design for a convenient carry, a simple and easy manufacturing procedure and a low manufacturing cost.

To achieve the foregoing objective, the present invention provides a one-piece support stand to slantingly support an object on a work surface, and the support stand comprises a central folding line for dividing the support stand into a left support panel and a right support panel interconnected with each other, and each of the support panels being substantially in a triangular shape and having a bottom edge and a bevel edge, and an inverted hook portion being formed at an intersection of the bottom edge and the bevel edge and bent towards the bevel edge, wherein the support stand is erected on the work surface by means of setting an included angle between the two bottom edges, and the two bevel edges and the two inverted hook portions being provided for supporting the object.

Compared with the prior art, the present invention has the following effects:

Since the support stand of the present invention is integrally formed, therefore its structure is very simple and does not require components such as the connecting rod, the support leg or the pivot as required in the prior art. The support stand of the present invention is made of a plastic or rubber material and manufactured by one-piece injection molding, and thus it has the features of an easy manufacture, a low cost, and a light, thin, short and compact design.

The support stand of the present invention is substantially in a triangular shape, and both interconnected support panels are provided for slantingly supporting an object on a work surface. In addition, the whole support stand can be folded along the central folding line to overlap the two support panels to reduce the occupied space and facilitate the user's carry, when the support stand is not in use. In addition, the support stand is light-weighted, so that users can carry the support stand of the present invention together with a thin electronic device anywhere for their use, and its application is very convenient and practical.

According to another feature of the present invention, the included angle between the bottom edges of the two support panels can be adjusted appropriately to control the inclination of the support stand and the spreading range of the two support panels, so that users may change the inclination of supporting the object according to their preference or adjust the spreading range of the support stand according to the width of the object.

DESCRIPTION OF THE PREFERRED EMBODIMENTS

The technical characteristics and contents of the present invention will become apparent with the following detailed description and related drawings. The drawings are provided for the purpose of illustrating the present invention only, but not intended for limiting the scope of the invention.

Figure 1:
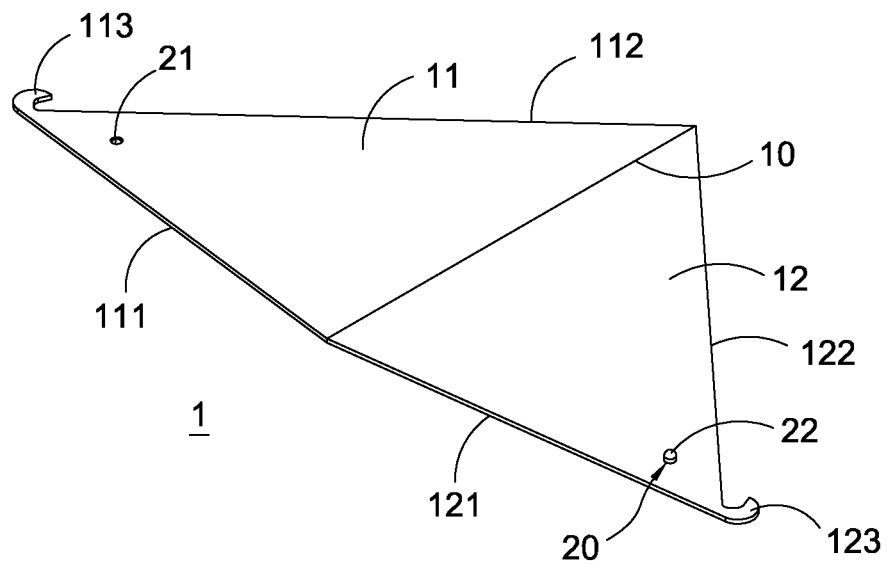
FIG. 1 is a perspective view of a support stand spread to an angle in accordance with the present invention.
Figure 2:
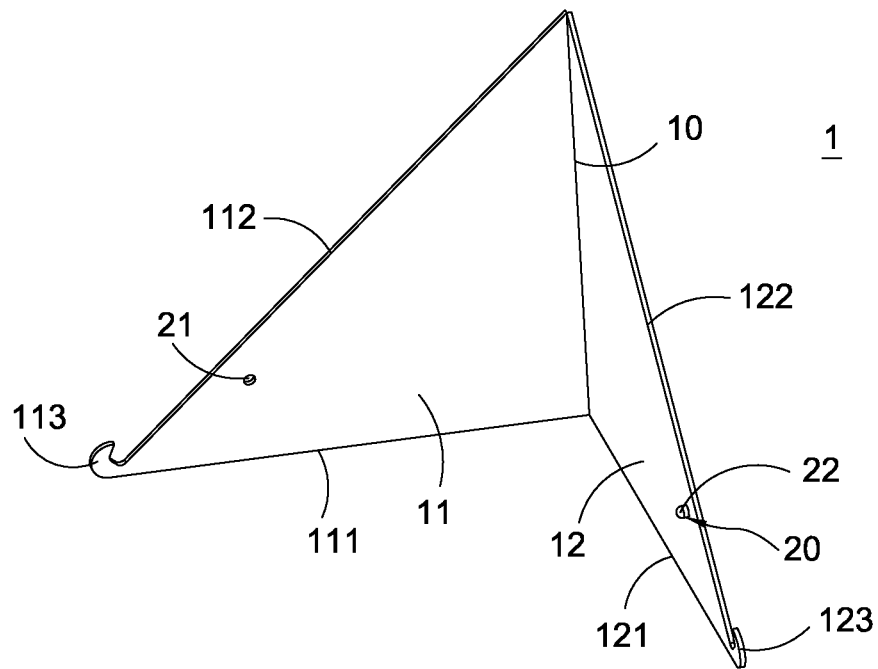
FIG. 2 is a perspective view of a support stand spread to another angle in accordance with the present invention.
Figure 3:
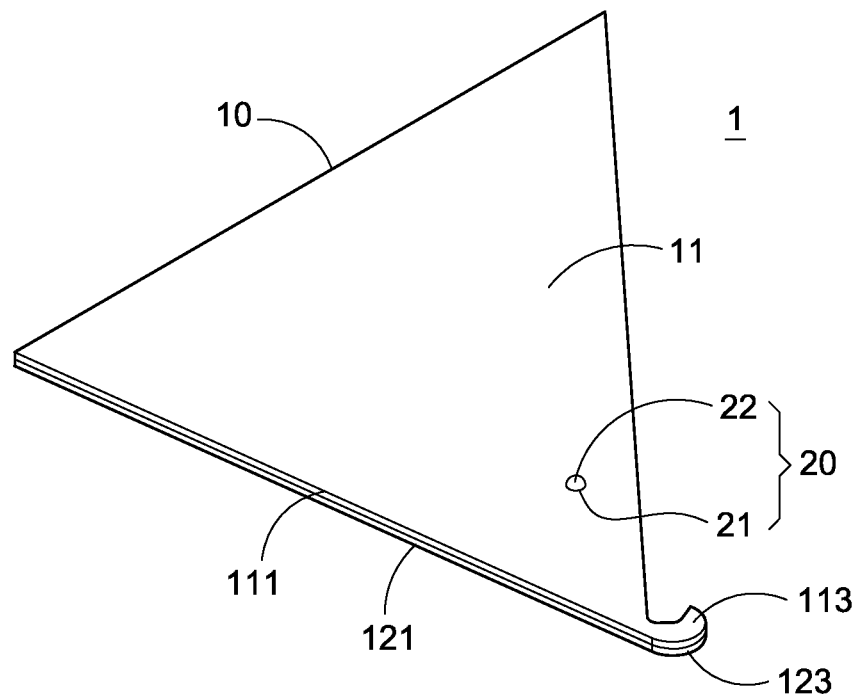
FIG. 3 is a perspective view of a support stand at a folded status in accordance with the present invention.
Figure 6:
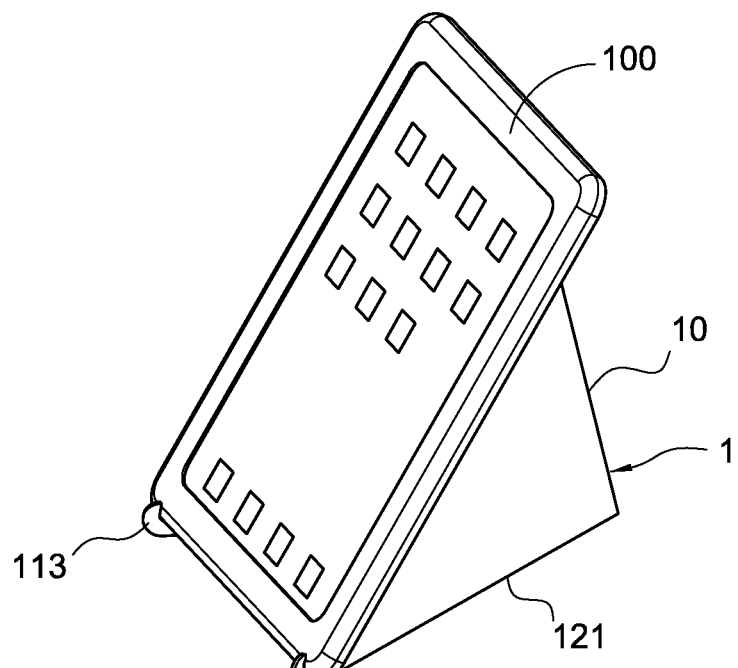
FIG. 6 is a schematic view of operating a support stand for supporting an object in accordance with the present invention.

With reference to FIGS. 1 to 3 for a one-piece support stand 1 (hereinafter referred to as a "support stand 1", the support stand 1 as shown in FIG. 6 slantingly supports an object 100 on a work surface (not shown in the figure).

The support stand 1 is made of a plastic or rubber material by one-piece injection molding, and a central folding line 10 is formed at the middle of the support stand 1, such that the support stand 1 is divided into a left support panel 11 and a right support panel 12 coupled with each other. For the simplicity of illustrating the present invention, the front side of the support stand 1 (which is the viewing angle of FIG. 2) is defined as the sideway direction of the support stand 1, when the support stand 1 is spread and erected.

The left support panel 11 is substantially in a triangular shape and has a left bottom edge 111 and a left bevel edge 112, and a left inverted hook portion 113 is formed at the intersection of the left bottom edge 111 and the left bevel edge 112 and bent towards the left bevel edge 112. Similarly, the right support panel 12 is substantially in a triangular shape and has a right bottom edge 121 and a right bevel edge 122, and a right inverted hook portion 123 is formed at the intersection of the right bevel edge 122 of the right bottom edge 121 and the right bevel edge 122 and bent towards the right bevel edge 122.

As shown in FIG. 2, the support stand 1 is erected on the work surface by means of setting an included angle between the left bottom edge 111 and the right bottom edge 121, and the left bevel edge 112, the right bevel edge 122, the left inverted hook portion 113, and the right inverted hook portion 123 are provided for supporting the object 100 (as shown in FIG. 6).

In addition, a folding means 20 is installed between the left support panel 11 and the right support panel 12. More specifically, the folding means 20 includes a concave portion 21 formed on the left support panel 11 and a convex portion 22 formed on the right support panel 12 and latched with the concave portion 21, such that the convex portion 22 of the right support panel 12 can be latched into the concave portion 21 of the left support panel 11, and the support stand 1 can be folded along the central folding line 10 for storage, and the support stand 1 will not be spread easily (as shown in the folded status in FIG. 3) to facilitate users to carry the folded support stand 1 anywhere. Of course, the convex portion 22 can be arranged on the left support panel 11 and the concave portion 21 can be arranged on the right support panel 12 to achieve the same folding and storage effects.

Figure 4:
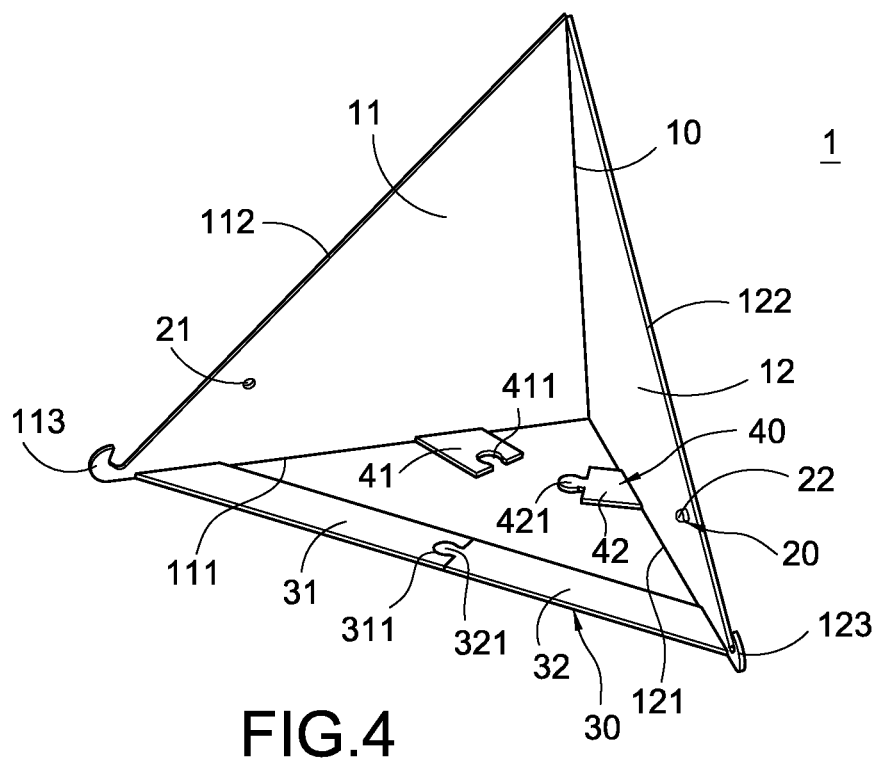
FIG. 4 is a perspective view of a support stand situated at a first spreading position in accordance with the present invention.
Figure 5:
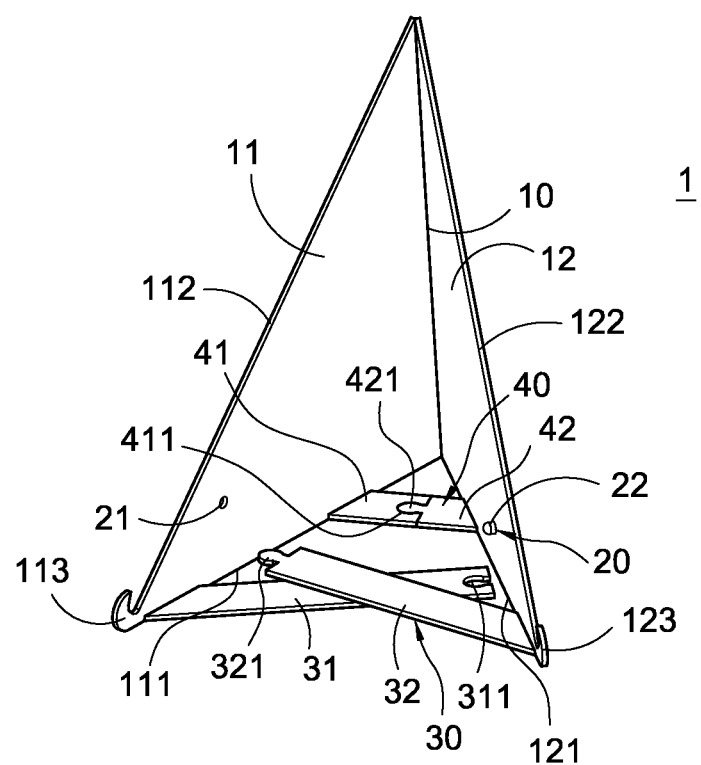
FIG. 5 is a perspective view of a support stand situated at a second spreading position in accordance with the present invention.

With reference to FIG. 4 for a support stand situated at a first spreading position in accordance with the present invention, a first spreading range fixing means 30 is installed between the left bottom edge 111 of the left support panel 11 and the right bottom edge 121 of the right support panel 12 to spread the support stand 1 to an spreading range stably to support the object 100 firmly. More specifically, the first spreading range fixing means 30 includes a left fixing strap 31 extended from the left bottom edge 111, a right fixing strap 32 extended from the right bottom edge 121, a concave portion 311 formed at a free end of the left fixing strap 31, and a convex portion 321 formed at a free end of the right fixing strap 32 and latched to the concave portion 311, such that the convex portion 321 of the right fixing strap 32 can be latched into the concave portion 311 of the left fixing strap 31, and the whole support stand 1 can be fixed to the first spreading position. Of course, the convex portion 321 can be formed on the left fixing strap 31 and the concave portion 311 can be formed on the right fixing strap 32 to achieve the same fixing effect.

In FIG. 6, similarly, a second spreading range fixing means 40 is installed between the left bottom edge 111 of the left support panel 11 and the right bottom edge 121 of the right support panel 12, and the second spreading range fixing means 40 is disposed on the internal side of the first spreading range fixing means 30 and proximate to the central folding line 10, such that the second spreading range fixing means 40 can be used for spreading the support stand 1 to a smaller angle. In other words, the angle of spreading the support stand 15 by using the second spreading range fixing means 40 is smaller than the angle of spreading the support stand 15 by using the first spreading range fixing means 30 to support an object 100 having a smaller width. More specifically, the second spreading range fixing means 40 includes a left fixing plate 41 extended from the left bottom edge 111 and a right fixing plate 42 extended from the right bottom edge 121; a concave portion 411 is formed at a free end of the left fixing plate 41, and a convex portion 421 is formed at a free end of the right fixing plate 42 and latched to the concave portion 411; such that when the convex portion 421 of the right fixing plate 42 is latched into the concave portion 411 of the left fixing plate 41, the whole support stand 1 can be fixed at the second spreading position. Now, the left fixing strap 31 and the right fixing strap 32 of the first spreading range fixing means 30 cannot be latched with each other, but they must be crossed between the left support panel 11 and the right support panel 12. Of course, the convex portion 421 can be arranged on the left fixing plate 41 and the concave portion 411 is arranged on the right fixing plate 42 to achieve the same fixing effect.

It is noteworthy to point out that if a user wants to fold the support stand 1 as shown in FIG. 3, the left fixing strap 31 of the first spreading range fixing means 30 and the left fixing plate 41 of the second spreading range fixing means 40 can be folded towards the internal side of the left support panel 11 and the right fixing strap 32 of the first spreading range fixing means 30 and the right fixing plate 42 of the second spreading range fixing means 40 can be folded towards the internal side of the right support panel 12 first, since the first spreading range fixing means 30 and the second spreading range fixing means 40 are also made of a plastic or rubber material and integrally formed with the support stand 1, so that the whole support stand 1 can be folded to a minimum size. Although the figure does not show this process, persons skilled in the art should understand the process easily.

Compared with the prior art, the present invention has the following effects:

Since the support stand of the present invention is integrally formed, therefore its structure is very simple, and the support stand does not require components such as the connecting rod, the support leg or the pivot as required in the prior art. The support stand of the present invention is made of a plastic or rubber material and manufactured by one-piece injection molding, and thus the present invention features an easy manufacture, a low cost, and a light, thin, short and compact design.

Since the present invention adopts both triangular interconnected left support panel 11 and right support panel 12 to slantingly support the object 100 on a work surface, such that when the support stand 1 is not in use, the whole support stand 1 can be folded along the central folding line 10 to overlap the left support panel 11 and the right support panel 12 so as to reduce the occupied space for an easy carry. In addition, the light weight of the support stand allows users to carry the support stand 1 with a thin electronic device anywhere for its use. Obviously, the present invention is very convenient and practical.

In the present invention, the first spreading range fixing means 30 and the second spreading range fixing means 40 can be used for adjusting the included angle between the left bottom edge 111 of the left support panel 11 and the right bottom edge 121 of the right support panel 12 to control the extent of spreading the left support panel 11 and the right support panel 12 of the support stand 1, such that users can change the inclination of supporting the object according to their preference or adjusting the extent of spreading the support stand 1 according to the width of the object.

In summation of the description above, the present invention improves over the prior art and complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. An one-piece support stand, for slantingly supporting an object on a work surface, and the support stand comprising a central folding line for dividing the support stand into a left support panel and a right support panel interconnected with each other, and each of the support panels being substantially in a triangular shape and having a bottom edge and a bevel edge, and an inverted hook portion being formed at an intersection of the bottom edge and the bevel edge and bent towards the bevel edge, wherein the support stand is erected on the work surface by means of setting an included angle between the two bottom edges, and the two bevel edges and the two inverted hook portions are provided for supporting the object, wherein the support stand is made of a plastic or rubber material and manufactured by one-piece injection molding, and the left support panel is substantially in a triangular shape and has a left bottom edge and a left bevel edge, and a left inverted hook portion is formed at an intersection of the left bottom edge and the left bevel edge and bent towards the left bevel edge, and the right support panel is substantially in a triangular shape and has a right bottom edge and a right bevel edge, and a right inverted hook portion is formed at an intersection of the right bottom edge and the right bevel edge and bent towards the right bevel edge, and wherein the support stand is erected on the work surface by means of setting an included angle between the left bottom edge and the right bottom edge, and the left bevel edge, the right bevel edge, the left inverted hook portion and the right inverted hook portion are provided for supporting the object; the support stand further comprising a folding means for connecting the left support panel to the right support panel, disposed between the left support panel and the right support panel, and the folding means including a concave portion formed on the left support panel, and a convex portion formed on the right support panel and latched with the concave portion, such that when the convex portion of the right support panel and the concave portion of the left support panel are latched with each other, the support stand can be folded along the central folding line for storage; a first spreading range fixing means installed between the left bottom edge and the right bottom edge, and the first spreading range fixing means including a left fixing strap extended from the left bottom edge, a right fixing strap extended from the right bottom edge, a concave portion formed at a free end of the left fixing strap, and a convex portion formed at a free end of the right fixing strap and latched with the concave portion; and a second spreading range fixing means installed between the left bottom edge and the right bottom edge, and the second spreading range fixing means is disposed at an internal side of the first spreading range fixing means and proximate to the central folding line, and the second spreading range fixing means spreading the support stand to an angle smaller than the angle of spreading the support stand by the first spreading range fixing means.

2. The one-piece support stand of claim 1, wherein the second spreading range fixing means includes a left fixing plate extended from the left bottom edge, a right fixing plate extended from the right bottom edge, a concave portion formed at a free end of the left fixing plate, and a convex portion formed at a free end of the right fixing plate and latched with the concave portion.

3. The one-piece support stand of claim 2, wherein the first spreading range fixing means and the second spreading range fixing means are made of a plastic or rubber material and integrally formed with the support stand, and the left fixing strap of the first spreading range fixing means and the left fixing plate of the second spreading range fixing means can be folded to the internal side of the left support panel, and the right fixing strap of the first spreading range fixing means and the right fixing plate of the second spreading range fixing means can be folded to the internal side of the right support panel.

* * * * *